United States Patent [19]

Dillard

[11] 3,855,271

[45] Dec. 17, 1974

[54] 2-AMINO-2-ALLENYLMALONIC ESTERS

[75] Inventor: Robert D. Dillard, Zionsville, Ind.

[73] Assignee: Eli Lilly and Company, Indianapolis, Ind.

[22] Filed: Dec. 20, 1973

[21] Appl. No.: 426,860

[52] U.S. Cl. ...... 260/468 J, 260/326.46, 260/482 P, 424/305, 424/311
[51] Int. Cl. .......................................... C07c 101/20
[58] Field of Search ...................... 260/482 P, 468 J

[56] References Cited
UNITED STATES PATENTS 2,523,745  9/1950  Warner et al. .................. 260/482 P
3,538,147  11/1970  Morita et al. .................... 260/482 P Primary Examiner—Lorraine A. Weinberger
Assistant Examiner—Paul J. Killos
Attorney, Agent, or Firm—William E. Maycock; Everet F. Smith

[57] ABSTRACT

2-Amino-2-allenylmalonic esters, useful as plant fungicides, are prepared by reacting an ethynylalkylamine with a bromomalonic ester in acetonitrile and in the presence of sodium bicarbonate, lithium carbonate, or excess ethynylalkylamine.

7 Claims, No Drawings

2-AMINO-2-ALLENYLMALONIC ESTERS

BACKGROUND OF THE INVENTION

This invention relates to 2-amino-2-allenylmalonic esters. More particularly, this invention relates to 2-amino-2-allenylmalonic esters, useful as plant soil and foliage fungicides, and to a method for preparing same.

Ornamental plants, food crops, and turf annually are severely damaged by many types of soil-borne and air-borne fungi. For example, fungi which occur in the soil can have a deleterious effect on germinating and growing plants. In many instances, the germination of seeds planted in fungus-infected soil is prevented entirely; even where germination occurs, the resulting seedlings often do not develop into healthy plants. Organisms affecting plants in this latter manner are known as seedling blight or damping-off fungi. Such fungi can be inhibited either by treatment of the soil wherein the seeds are to be planted or, in some instances, by direct treatment of the seeds themselves. Air-borne fungi, on the other hand, generally attack growing plants. Control of such fungi normally requires direct treatment of the plants themselves.

SUMMARY OF THE INVENTION

It therefore is an object of the present invention to provide novel 2-amino-2-allenylmalonic esters which are useful as plant soil and foliage fungicides.

This and other objects will be apparent to those skilled in the art from a consideration of the specification and claims which follow.

The compounds provided by the present invention are novel 2-amino-2-allenylmalonic esters having the following general formula:

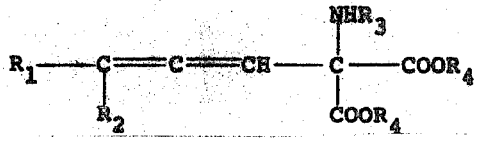

wherein $R_1$ and $R_2$ are independently-selected monovalent $C_1$–$C_5$ alkyl groups, or $R_1$ and $R_2$ taken together constitute a divalent polymethylene group having either 4 or 5 carbon atoms which, together with the carbon atom to which it is attached, completes a five- or six-membered carbocyclic ring;

$R_3$ is either hydrogen or methyl, with the proviso that $R_3$ must be methyl when $R_1$ and $R_2$ both are methyl; and $R_4$ is a monovalent $C_1$–$C_6$ alkyl group.

The 2-amino-2-allenylmalonic esters of the present invention are prepared by reacting an ethynylalkylamine with a bromomalonic ester in acetonitrile and in the presence of sodium bicarbonate, lithium carbonate, or excess ethynylalklamine.

DETAILED DESCRIPTION OF THE INVENTION

The term "$C_1$–$C_5$ alkyl" as used in this specification represents the following groups: methyl, ethyl, n-propyl, isopropyl, n-butyl, sec-butyl, isobutyl, t-butyl, n-pentyl, 2-methyl-1-butyl, isopentyl, 2-pentyl, 3-pentyl, t-pentyl, 3-methyl-2-butyl and neopentyl. When $R_1$ and $R_2$ together constitute a polymethylene group, there is formed with the carbon atom of attachment either a cyclopentyl ring or a cyclohexyl ring. The term "$C_1$–$C_6$ alkyl" as used in this specification represents all of the groups included in the term "$C_1$–$C_5$ alkyl" plus the analogous hexyl groups. Preferably, $R_1$ is methyl or ethyl and $R_2$ is methyl, ethyl, or isopropyl; or, $R_1$ and $R_2$ together constitute a pentamethylene group. Also, $R_4$ preferably is methyl or ethyl.

The most preferred compounds of the present invention are diethyl 2-amino-2-(3,4-dimethyl-1,2-pentadienyl)-malonate, diethyl 2-(cyclohexylidenevinyl)-2-methylaminomalonate, diethyl 2-(3-methyl-1,2-butadineyl)-2-methylaminomalonate, and diethyl 2-(3-ethyl-1,2-pentadienyl)-2-methylaminomalonate.

The compounds of the present invention have been shown by suitable tests to be effective against such fungi as *Fusarium solani* f. *phaseoli*, the organism responsible for root rot in beans; *Rhizoctonia solani*, the organism responsible for damping-off in cotton; *Verticillium alboatrum*, the organism responsible for verticillium wilt in cotton; *Uromyces phaseoli*, the organism responsible for bean rust; and *Pythium aphanidermatum*, the organism responsible for pythium damping-off in cotton.

In practice, the fungi to be controlled are contacted by the fungicidal compounds of the present invention according to methods well known to those skilled in the art. In general, the fungicidal composition is applied to infected or susceptible plant surfaces in any convenient fashion, which includes spraying, dusting, dipping, and drenching. A spray method is preferred, especially when large numbers of plants are involved because of the rapidity and uniformity of treatment which is possible. In such a method, it usually is sufficient for the infected or susceptible plant surfaces to be thoroughly wet with the liquid fungicidal composition employed.

When the fungi to be controlled are in the soil, the fungicidal compounds of the present invention can be applied to the soil directly; alternatively, such compounds can be diluted with various inert solid or liquid materials, as described hereinbelow, and then applied to the fungus-infested area. When applied directly to the soil, the fungicidal compositions are allowed to remain as a coating on the surface of the soil; however, such compositions can be incorporated into the soil by discing, hoeing, or other methods well known to those skilled in the art.

In general, the compounds of the present invention are utilized in effective amounts, which amounts will vary somewhat with the particular fungus to be treated, the severity of the infection, the manner of treatment, and with other factors such as the environment in which treatment is conducted. In general, when used as foliar fungicides the compounds will be employed at levels of from about 1 to about 4 lbs/acre. Preferably, the range of application will be from about 1 to about 2 lbs/acre. When used as soil fungicides, the compounds normally will be employed at levels of from about 1 to about 20 lbs/acre, and preferably from about 1 to about 5 lbs/acre.

As indicated hereinabove, the compounds of the present invention can be used directly or they can be diluted with various inert solid or liquid materials. Such inert solid or liquid materials include, among others, water, polyhydroxy compounds, petroleum distillates, and other dispersion media, surface active dispersing agents and emulsifiers, and finely-divided inert solids. When such diluents are employed, the concentration of a fungicidal compound disclosed in the present invention can vary depending upon whether the composition is intended to be used in an emulsifiable concentrate or as a wettable powder designed to be subsequently diluted with additional inert carriers, such as water, to produce the ultimate treating composition, or is intended for direct application as a dust to plants.

Frequently, treating compositions are most conveniently formulated by preparing liquid or solid concentrates which subsequently are diluted to the desired level for use. Emulsifiable liquid concentrates can be prepared by incorporating from about 1 to about 10 percent by weight of the fungicidal component with an emulsifying agent in a suitable water-immiscible organic liquid. Such concentrates may be further diluted with water to form spray mixtures in the form of oil-in-water emulsions. Such spray compositions then comprise active toxicant, water-immiscible solvent, emulsifying agent, and water. Suitable emulsifying agents can be of the nonionic or ionic types, or blends thereof, and include condensation products of alkylene oxides with phenols and organic acids, polyoxyethylene derivatives of sorbitan esters, complex ether alcohols, ionics of the arylalkyl sulfonate type, and the like. Suitable water-immiscible organic liquids which can be employed include aromatic hydrocarbons, aliphatic hydrocarbons, cycloaliphatic hydrocarbons, and mixtures thereof, such as petroleum distillate.

Solid concentrate mixtures can be prepared by incorporating from about 10 to about 50 percent by weight of a fungicidal compound of the present invention in a finely-divided inert solid carrier such as bentonite, Fuller's earth, diatomaceous earth, hydrated silica, diatomaceous silica, expanded mica, talc, chalk, and the like. Such concentrates can be formulated, if desired, for direct use as dusting compositions, or can be diluted, if desired, with additional inert solid carriers to produce dusting powders containing from about 2 to about 5 percent by weight of the fungicidal component. Alternatively, surfactants, that is, dispersing and/or wetting agents, can be incorporated along with the fungicidal compound in the solid carrier to form wettable powder concentrates containing from about 10 to about 90 percent by weight concentration of fungicidal compound, which composition subsequently can be dispersed in water or other hydroxylated carrier to form spray compositions. Such spray compositions typically contain from about 0.1 to about 1.0 percent by weight of fungicidal compound. Suitable surfactants include condensed aryl sulfonic acids and sodium salts thereof, sodium lignosulfate, sulfonate-oxide condensate blends, alkylarylpolyether alcohols, sulfonated nonionic blends, anionic wetting agents, and the like.

Furthermore, the fungicidal compounds of the present invention can be incorporated into solutions, simple dispersions, aerosol formulations, and other media adaptable to be employed for treating vegetation or applying to the soil, by methods known to those skilled in the art.

When the fungicidal compounds of the present invention are to be applied directly to seeds, a coating formulation is prepared which contains the fungicidal compound and optionally a suitable dye, together with other excipients such as glycerin, hydroxypropylmethylcellulose, isopropyl alcohol, acetone, methylene chloride, and the like. The dye, for example, F.D. and C. RED No. 2, when used, is merely added to identify the seeds as being coated and treated. The seeds are mixed in any suitable apparatus using a mixture of the coating formulation, a solution of the desired fungicidal compound, and optionally a solution of a suitable dye.

The compounds of the present invention are prepared by reacting an ethynylalkylamine with a bromomalonic ester in acetonitrile and in the presence of sodium bicarbonate, lithium carbonate, or excess ethynylaklylamine. In general, the suitable ethynylalkylamines are represented by the following general formula.

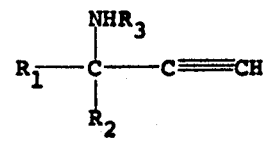

wherein $R_1$, $R_2$, and $R_3$ are as defined hereinbefore.

Examples of suitable ethynylalkylamines include, among others, 3-methyl-3-methylamino-1-butyne, 3,4-dimethyl-3-amino-1-pentyne, 3-ethyl-3-methylamino-1-pentyne, 3-methyl-3-amino-1-octyne, 3-neopentyl-6-methyl-3methylamino-1-heptyne, 1-ethynyl-1-methylaminocyclohexane, 1-ethynyl-1-methylaminocyclopentane, and the like. The most preferred compounds are 3-methyl-3-methylamino-1-butyne, 3,4-dimethyl-3-amino-1-pentyne, 3-ethyl-3-methylamino-1-pentyne, and 1-ethynyl-1-methylaminocyclohexane.

The ethynylalkylamines are readily prepared by the procedure of N. R. Easton et al., *J. Org. Chem.*, 26, 3772 (1961) (see also U.S. Pat. No. 3,285,913), which procedure involves the reaction of an acetylenic halide with an amine.

The suitable bromomalonic esters can be represented by the following general formula:

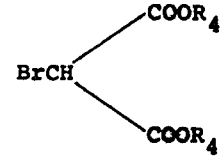

wherein $R_4$ is as defined hereinbefore.

Examples of suitable bromomalonic esters include, among others, dimethyl bromomalonate, diethyl bromomalonate, di-n-propyl bromomalonate, diisopropyl bromomalonate, di-n-butyl bromomalonate, diisobutyl bromomalonate, di-sec-butyl bromomalonate, di-t-butyl bromomalonate, di-n-pentyl bromomalonate, dineopentyl bromomalonate, diisohexyl bromomalonate, and the like. The preferred bromomalonic esters are dimethyl bromomalonate and diethyl bromomalonate. The most preferred ester is diethyl bromomalonate.

The mole ratio of ethynylalkylamine to bromomalonic ester can range from about 1:1 to about 5:1. Preferably, this molar ratio will be within the range of from about 1:1 to about 2.5:1; the most preferred molar ratio is 1.5:1.

As stated hereinbefore, the reaction of the ethynylalkylamine with the bromomalonic ester is carried out in acetonitrile. In general, the amount of acetonitrile employed is not critical. Typically, the amount of acetonitrile will be at least 50 percent of the amount of total reactants and solvent combined. Often, however, the solvent will constitute about 75 percent of the total reaction mixture.

It perhaps should be pointed out that, depending upon the ethynylalkylamine and bromomalonic ester to be employed, aliphatic nitriles other than acetonitrile, such as butyronitrile, often can be employed as solvents. However, such solvents generally are less satisfactory than acetonitrile. Furthermore, the usual organic solvents, such as ethanol and benzene, are disfavored because of the pronounced tendency of a bromomalonic ester to couple with itself in these solvents.

As stated hereinbefore, the reaction of the ethynylalkylamine with the bromomalonic ester requires the presence of sodium bicarbonate, lithium carbonate, or excess ethynylalkylamine as an acid scavenger, with sodium bicarbonate being preferred. Because each mole of bromomalonic ester generates one mole of hydrobromic acid, the acid scavenger should be employed in at least an equivalent amount. That is, the molar ratio of acid scavenger to bromomalonic ester should be at least about 1:1. Preferably, a slight excess of acid scavenger will be employed. Thus, the preferred molar ratio of acid scavenger to bromomalonic ester is in the range of from about 1:1 to about 1.1:1.

Without wishing to be bound by a particular mechanism of reaction, it is believed that the reaction of an ethynylalkylamine with a bromomalonic ester proceeds through formation of an acetylenic intermediate as shown by equation (1):

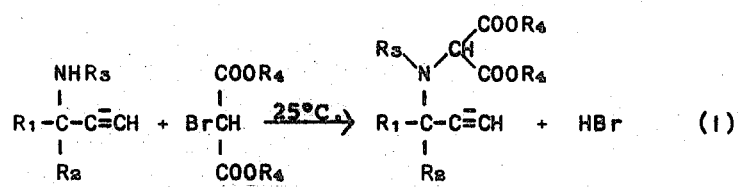

(1)

wherein $R_1$, $R_2$, $R_3$, and $R_4$ are as defined hereinbefore.

The intermediate generally is sensitive to both heat and acid. However, the intermediate usually is obtained when the reaction is carried out at ambient temperature, e.g., about 25°C., for extended periods of time, e.g. 1-2 weeks. Isolation of the intermediate usually is accomplished by distilling the reaction mixture (usually after extraction with benzene, washing the benzene extract with water, and drying) under reduced pressure in the presence of copper metal which inhibits rearrangement of the intermediate.

If any ethynylalkylamine and a bromomalonic ester are heated at an elevated temperature (in acetonitrile and in the presence of an acid scavenger), the intermediate is not obtained; under these conditions the products of the reaction are a 2-amino-2-allenylmalonic ester and a 3-pyrroline-2,2-dicarboxylic acid ester, which probably results from the cyclization of the allenylmalonic ester, as shown by equation (2).

The amounts of allenylmalonic ester and pyrroline compound obtained in general are dependent upon the substituents present on the ethynylalkylamine, reaction

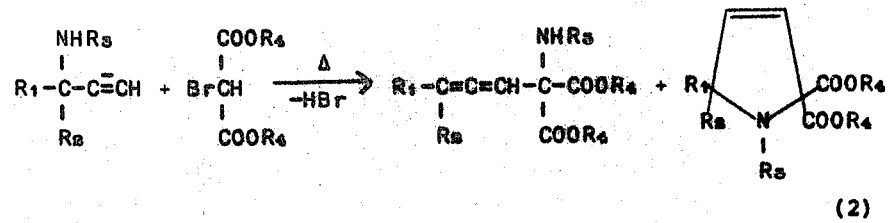

(2)

time and temperature, and the acid scavenger employed. Thus, as steric hindrance increases, i.e., as the bulk of $R_1$, $R_2$, and/or $R_3$ increases, the amount of pyrroline compound obtained decreases. Increased reaction times and/or higher reaction temperatures tend to increase the amount of pyrroline compound obtained. Furthermore, the use of excess ethynylalkylamine as acid scavenger favors formation of pyrroline compound; the formation of allenylmalonic ester is favored by using sodium bicarbonate as acid scavenger. Interestingly, copper metal inhibits conversion of the intermediate to allenylmalonic ester but catalyzes the conversion of allenylmalonic ester to pyrroline compound.

The reaction temperature employed in carrying out the preparation of allenylmalonic ester according to equation (2) normally is the reflux temperature at atmospheric pressure of acetonitrile.

Clearly, the reaction temperature must be below the decomposition temperatures of the reactants employed. Usually, the reaction temperature will be below about 100°C., preferably, the reaction temperature will be below about 85°C. While not preferred, higher temperatures can be employed through the use of superatmospheric pressure. Conversely, lower temperatures can be employed by carrying the reaction out under subatmospheric pressure.

As with most chemical reactions, the reaction time is to a large extent dependent upon the reaction temperature. At higher reaction temperatures, shorter reaction times can be employed. Generally, the reaction times will be in the range of from about 8 to about 120 hours. The preferred reaction times are from about 48 to about 72 hours.

Heating the intermediate also gives allenylmalonic ester and pyrroline compound, as shown by equation (3),

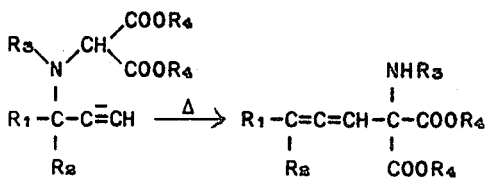
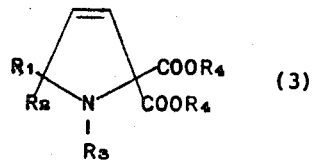

although normally the intermediate is not isolated and allenylmalonic ester is prepared as shown by equation (2).

When preparing allenylmalonic ester by the reaction of equation (3), the temperature generally is maintained only as high as necessary to achieve the desired rearrangement. Such a temperature often will be within the range of from about 20 to about 120°C. above the boiling point of allenylmalonic ester (under reduced pressure). The intermediate in practice is vacuum-distilled to give a mixture of allenylmalonic ester and pyrroline compound, which mixture generally can be fractionated either during or subsequent to the distillation procedure.

Upon completion of the reaction, the reaction mixture is worked-up by methods well known to those skilled in the art. For example, the reaction mixture is allowed to cool, washed with water, and then extracted with excess 10 percent hydrochloric acid. The aqueous solution then is made strongly basic with 50 percent aqueous sodium hydroxide and extracted with ether. The ether extract is dried over a suitable drying agent, such as anhydrous magnesium sulfate, decanted from the drying agent, and distilled at reduced pressure.

The present invention is further described, but not limited, by the following examples which illustrate certain preferred embodiments. Unless otherwise stated, all temperatures are in °C.

EXAMPLE 1

A mixture of 20.6 g. of N-methyl-1-ethynylcyclohexylamine, 23.9 g. of diethyl bromomalonate, 8.4 g. of sodium bicarbonate, and 200 ml. of acetonitrile was heated at reflux for 3 days. After cooling, the mixture was washed with water, and then extracted with excess 10 percent hydrochloric acid. The aqueous acidic solution was made strongly basic with 50 percent aqueous sodium hydroxide, and then extracted with ether. The ether solution was dried over anhydrous magnesium sulfate, decanted from the drying agent, and distilled at reduced pressure. The fraction boiling at 113–5°/0.05mm. was collected to give 14.4 g. (50 percent yield) of diethyl 2-(cyclohexylidenevinyl)-2-methylaminomalonate. The following analytical data were obtained:

Calculated for $C_{16}H_{25}NO_4$:
C, 65.06; H, 8.53; N, 4.74
Found:
C, 64.01; H, 8.62; H, 5.00.

Following the general procedure of Example 1, using appropriate starting materials, the following compounds were prepared:

Diethyl 2-(3-methyl-1,2-butadienyl)-2-methylmalonate, in 28 percent yield; b.p., 85-6°/9.1 mm.; the following analytical data were obtained:
Calculated for $C_{13}H_{21}NO_4$:
C, 61.15; H, 8.29; N, 5.49;
Found:
C, 61.28; H, 8.52; N, 5.48.

Diethyl 2-amino-2-(3,4-dimethyl-1,2-pentadienyl)-malonate, in a yield of 18 percent; b.p., 134-8°/4.0 mm.; the following analytical data were obtained:
Calculated for $C_{14}H_{23}NO_4$:
C, 62.43; H, 8.61; N, 5.20;
Found:
C, 62.63; H, 8.59; N, 5.46.

Diethyl 2-(3-ethyl-1,2-pentadienyl)-2-methylaminomalonate, in a yield of 34 percent; b.p., 86–90°/0.02 mm.; the following analytical data were obtained:
Calculated for $C_{15}H_{25}NO_4$:
C, 63.58; N, 8.89; N, 4.94;
Found:
C, 63.84; H, 9.03; N, 5.14.

EXAMPLE 2

A mixture of 24.6 g. of 1-ethynylcyclohexylamine, 23.9 g. of diethyl bromomalonate, 12.6 g. of sodium bicarbonate, and 200 ml. of acetonitrile was stirred under a nitrogen atmosphere for 18 days. Using 10 g. of copper powder, the reaction mixture was diluted with benzene, washed, and dried as described in Example 1. The resulting benzene solution was stripped of solvent and the oily residue was held at 50°/0.05 mm. until distillate no longer was removed. The residue, which did not distill, consisted of 21.3 g. (76%) of diethyl 2-[(1-ethynylcyclohexyl)amino]-malonate.

Calculated for $C_{15}H_{23}NO_4$:
C, 64.04; H, 8.24; N, 4.98;
Found:
C, 64.35; H, 8.34; N, 5.28.

EXAMPLE 3

The activities of the compounds of the present invention against various fungi were investigated and the following results obtained:

| Compound | FRR[a] | DO-P[b] | DO-R[c] | VW[d] | BR[e] |
|---|---|---|---|---|---|
| Diethyl 2-(cyclohexylidenevinyl)-2-methylaminomalonate | 3 | 1 | 2 | 1 | —[f] |
| Diethyl 2-(3-methyl-1,2-butadienyl)-2-methylaminomalonate | — | — | — | — | 5[g] 3[h] 1[i] |
| Diethyl 2-amino-2-(3,4-dimethyl-1,2-pentadienyl)malonate | 1 | 4[j] | 1 | 1[j] | 1 |
| Diethyl 2-(3-ethyl-1,2-pentadienyl)-2-methylaminomalonate | 1 | 1 | 1 | 5 | 5 | a FRR - Fusarium root rot
b DO-P - Pythium damping off
c DO-R - Rhizoctonia damping off
d VW - Vericillium wilt
e BR - Bean rust
f - Not tested
g Tested at 40 ppm.
h Tested at 20 ppm.
i Tested at 10 ppm.
j Moderate stunting observed In the above table, the following code was employed for the effectiveness ratings listed: 1, not effective; 2, slightly effective; 3, moderately effective; 4, good effectiveness; 5, completely effective, i.e. no fungus.

The Fusarium root rot test was carried out as follows:

Eight oz. paper cups or glass jars were charged with 150 g. of pathogen-infested soil. The test chemical was applied to the soil, the soil planted to 3 bean seeds, and the pots were placed in a room having a relatively humidity of 70 percent and a temperature of 75°F. In three days, after emergence of the beans, the pots were placed in the greenhouse. After 14 days, symptoms of root rot were observed and the results recorded.

Preparation of Fusarium-infested soil:

A bench containing Fusarium-infested sand was maintained in the greenhouse to supply simulated field soil for this test. The fungal population was held fairly constant through periodic reinoculations with Fusarium-infested wheat seeds whenever the bench was replenished with sand. To maintain the pathogenicity of the organism, Bountiful variety beans were heavily seeded in the sand to serve as host plants. Whenever the infested sand was used, it was first screened to remove the wheat seeds, roots, and other organic debris, and then diluted 50 percent with unsterile greenhouse soil.

The Pythium damping-off test was carried as follows:

To 8 oz. paper cups or glass jars were added 150 g. of pathogen-infested soil. The test chemical was applied to the soil, the soil planted to 12 cotton seeds, and the pots handled as described in the Fusarium root rot test. After 3 days, the pots were placed in the greenhouse. After 14 days, symptoms of damping-off were observed and the results recorded.

Preparation of Pythium-infested soil:

Four one-ml. portions of dry cornmeal were autoclaved for 20 minutes at 121°C. in 50 ml. flasks. After sterilization, 3 ml. of sterile water was added to each flask and the cornmeal was inoculated with one isolate of *P. aphanidermatum* per flask. After 48 hours incubation, the Pythium-infested cornmeal was transferred to one-gallon cans containing screened (mesh 16) autoclaved soil, thoroughly incorporated with the soil, and the cans were covered with polyethylene. The 4 Pythium isolates were still separate. After 72 hours incubation at room temperature, the 4 soils were mixed and again screened and incubated an additional 24 hours prior to use. On the test day, infested soil was mixed with non-infested, autoclaved soil in a 1:6 ratio for actual use in the test.

The Rhizoctonia damping-off test was carried out as follows:

To 8 oz. paper cups or glass jars were added 150 g. of pathogen-infested soil. The test chemical was applied to the soil, the soil planted to 12 cotton seeds, and the pots handled as described in the Fusarium root rot test. The pots were then treated as described in the Pythium damping-off test.

Preparation of Rhizoctonia-infested soil:

Four ml. of dry cornmeal was autoclaved for 20 minutes at 121°C. in a 50 ml. flask. After sterilization, 2 ml. of sterile water was added to the flask and the cornmeal was inoculated with a *R. solani*. After 7–10 days incubation, the Rhizoctonia-infested cornmeal was pulverized with sterile, air-dried soil using a mortar and pestle. Mixing and pulverization were continued until 196 ml. of dry soil had been added. On the test day, the above inoculum concoction was diluted with non-infested screened (mesh 15), autoclaved soil in a 1:19 ratio for actual use in the test. The final inoculum concentration was 0.1 percent by volume.

The Verticillium wilt test was carried out as follows:

Six cotton seeds were planted in 2.5-inch pots containing soil. The pots later were thinned to four plants. After 21 days, the plants were removed from the pots with the root ball intact. The roots were sprayed with a conidial suspension of the fungus. The plants were returned to the pot. The same day, the test chemical was sprayed on all leaf surfaces and allowed to dry. The plants then were placed in the greenhouse. Symptoms of the wilt disease were observed after 42 days and the results recorded.

The test chemical was applied at a level of 400 parts per million; the test solution was prepared by dissolving 70 mg. of the test chemical in 1.75 ml. of a 50/50 acetone/ethanol mixture containing 3.5 percent Toximal R and 2 percent Toximal S. The test solution was applied to each plant with a Devilbis atomizer at 10 p.s.i.g. air pressure to just past the run-off point.

Preparation of Verticillum wilt inoculum:

The fungus was grown on potato dextrose agar medium for 14 days at 24°C. One 2-liter flask containing 700 ml. of Czapek-Dox broth is inoculated with 2 petri plate cultures of the fungus and placed on the reciprocal shaker for 72 hours at 27°C.

The bean rust test was carried out as follows:

Five bean seeds were planted in sand in 4-inch plastic pots. After 9 days, the primary leaves of each plant were inoculated with rust spores, and the plants placed for 24 hours in the constant humidity-temperature room described in the Fusarium root rot test. After 10 days total elapsed time, the plants were removed from the pots and placed in test tubes containing an aqueous solution of 100 parts per million of test chemical and 0.85 percent sodium chloride and moved to the greenhouse where they were aerated 4 times daily. After a total elapsed time of 16 days, symptoms of the disease were observed and the results recorded.

Preparation of bean rust inoculum:

Fresh rust spores were harvested from pinto beans and refrigerated at 5°C. until needed. The rust inoculum was prepared by adding to 100 ml. of water 50 mg. of rust spores; the inoculum then was applied to the bean plants with a Devilbis sprayer.

From Example 2, it is clear that the compounds of the present invention exhibit activity against selected plant soil and foliage fungicides.

What is claimed is:

1. A compound of the following general formula:

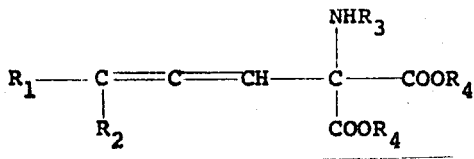

wherein $R_1$ and $R_2$ are independently-selected $C_1$–$C_5$ alkyl groups, or $R_1$ and $R_2$ taken together constitute a divalent polymethylene group having either 4 or 5 carbon atoms, which, together with the carbon atom to which it is attached, completes a five- or six-membered carbocyclic ring;

$R_3$ is either hydrogen or methyl, with the proviso that when $R_1$ and $R_2$ both are methyl, $R_3$ must be methyl; and $R_4$ is monovalent $C_1$–$C_6$ alkyl group.

2. The compound of claim 1, wherein $R_1$ is methyl or ethyl and $R_2$ is methyl, ethyl, or isopropyl.

3. The compound of claim 1, wherein $R_1$ and $R_2$ taken together constitute a pentamethylene group.

4. Diethyl 2-amino-2-(3,4-dimethyl-1,2-pentadienyl)-malonate.

5. Diethyl 2-(cyclohexylidenevinyl)-2-methylaminomalonate.

6. Diethyl 2-(3-methyl-1,2-butadienyl)-2-methylaminomalonate.

7. Diethyl 2-(3-ethyl-1,2-pentadienyl)-2-methylaminomalonate.

* * * * *